(12) United States Patent
Metzger (10) Patent No.: US 7,650,207 B2
(45) Date of Patent: Jan. 19, 2010

(54) LOCOMOTIVE/TRAIN NAVIGATION SYSTEM AND METHOD

(75) Inventor: Thomas R. Metzger, Wheatfield, NY (US)

(73) Assignee: Lockheed Martin Corp., Bethesda, MD (US)

( * ) Notice: Subject to any disclaimer, the term of this patent is extended or adjusted under 35 U.S.C. 154(b) by 572 days.

(21) Appl. No.: 11/416,068

(22) Filed: May 3, 2006

(65) Prior Publication Data

US 2006/0253233 A1 Nov. 9, 2006

Related U.S. Application Data

(60) Provisional application No. 60/677,332, filed on May 4, 2005.

(51) Int. Cl.
*G05D 1/00* (2006.01)
(52) U.S. Cl. .............................. 701/19; 701/1; 701/200; 246/122 R; 246/273; 246/322; 33/287; 33/338; 33/532; 33/651
(58) Field of Classification Search .................. 701/19, 701/1, 200; 33/287, 338, 532.1, 651
See application file for complete search history.

(56) References Cited

U.S. PATENT DOCUMENTS

| | | | | |
|---|---|---|---|---|
| 5,012,413 A | * | 4/1991 | Sroka et al. .................... | 701/19 |
| 5,129,605 A | * | 7/1992 | Burns et al. .................... | 246/5 |
| 5,367,463 A | * | 11/1994 | Tsuji ........................... | 701/216 |
| 5,950,967 A | * | 9/1999 | Montgomery ........... | 246/182 R |
| 6,218,961 B1 | * | 4/2001 | Gross et al. .................. | 340/903 |
| 6,434,452 B1 | * | 8/2002 | Gray ........................... | 701/19 |
| 6,641,090 B2 | * | 11/2003 | Meyer ..................... | 246/122 R |
| 6,804,621 B1 | * | 10/2004 | Pedanckar ..................... | 702/94 |
| 6,829,558 B2 | * | 12/2004 | Swope et al. ................. | 702/151 |
| 6,845,953 B2 | * | 1/2005 | Kane et al. ..................... | 246/20 |
| 7,557,748 B1 | * | 7/2009 | Zahm et al. ............. | 342/357.08 |
| 2002/0088904 A1 | * | 7/2002 | Meyer ........................ | 246/124 |
| 2003/0216865 A1 | * | 11/2003 | Riewe et al. ................. | 701/220 |
| 2004/0026574 A1 | * | 2/2004 | Seifert ........................... | 246/5 |
| 2004/0140405 A1 | * | 7/2004 | Meyer .................... | 246/122 R |
| 2005/0010338 A1 | * | 1/2005 | Kraeling et al. ............... | 701/19 |
| 2005/0065726 A1 | * | 3/2005 | Meyer et al. ................. | 701/213 |
| 2005/0068184 A1 | * | 3/2005 | Kane et al. ................... | 340/576 |

\* cited by examiner

*Primary Examiner*—Khoi Tran
*Assistant Examiner*—Jonathan Sample
(74) *Attorney, Agent, or Firm*—Wallace G. Walter (57) ABSTRACT

In a rail track system having transition points, a locomotive having a navigation system (such as a combined inertial/GPS location system) moves along an initially known track and enters the "halo" surrounding a track transition to begin data collection/logging to accumulate successive position information data points as the locomotive moves into, progresses through, and exits the "halo." The collected data for movement within the "halo" is then subject to a best fit assessment relative to the data pre-stored in the track database.

12 Claims, 6 Drawing Sheets

LOCOMOTIVE/TRAIN NAVIGATION SYSTEM AND METHOD

CROSS-REFERENCE TO RELATED APPLICATION

This application claims the benefit of commonly owned U.S. Provisional Patent Application 60/677,332 filed by the inventor herein on May 4, 2005.

BACKGROUND OF THE INVENTION

The present invention relates to system and method for positionally locating a train/locomotive on a trackway system.

Various systems have been developed to track the movement of and/or location of railway locomotives on track systems including the system disclosed in U.S. Pat. No. 6,641,090 issued Nov. 4, 2003 to Thomas J. Meyer and in common assignment herewith in which inertial components (including accelerometers and gyroscopes) cooperate with GPS information to provide location data.

Track databases are maintained that store track information including the absolute and relative position of tracks and track transitions such as, for example, switches and turnouts. Ideally, railroad tracks are perfectly uniform and remain consistent with their original design as straight tangent sections connected by constant curve and spiral sections. In practice, however, weather and geographical conditions, train speeds, tonnage, and continued maintenance requirements contribute to railroad track non-uniformities. The Federal Track Safety Standards (FTSS) divide railroad track into nine (9) speed-related classifications as a function of speed with permissible variations of track geometry provided for each track class. Although the FRA (Federal Rail Administration) regulates the amount of track irregularities permitted for each track class (Class 1-7), most track database information carries errors that can change with time and which are often difficult to and expensive to ascertain with accuracy. Regardless of the issues related to the positional changes in the track consequent to time and usage, track surveys are rarely conducted with the accuracy required for positive train control.

As is often the case, disparities arise between the output of the train/locomotive mounted location determining system and the corresponding database information; at times, the disparities can be such that resolving these disparities sufficiently to resolve to a specific track with a high degree of confidence can be difficult.

SUMMARY OF THE INVENTION

The present invention provides a method for navigation over a track system that is based upon less than optimal track accuracy database and recognizes that, for the most part, accurate track surveys do not exist and that the corresponding database only provides relatively coarse absolute position information that is likewise less than optimum.

In accordance with one aspect of the present invention, a mathematical "halo" is conceptually associated or assigned to one or more and preferably all transition points within the trackway system. As a locomotive having a navigation system (such as a combined inertial/GPS location system) moves along an initially known track and enters the "halo" surrounding a track transition, data collection/logging commences to accumulate successive position information data points as the locomotive moves into, progresses through, and exits the "halo." The collected data for movement within the "halo" is then subject to a best fit assessment relative to the data pre-stored in the track database. In this assessment, emphasis is given to fitting the "relative geometry" of successive data points within the "halo" for that track transition and not to the absolute geo-position data. Since absolute geo-position information is discounted and relative information within the "halo" is determinative, best fit track identification from the database upon exiting the "halo" can be quickly resolved.

As used herein and in a general sense, the term "train" is treated as an equivalent of the term "equipped locomotive" or simply "locomotive" and reflects the fact that device(s) embodying the present invention is/are to be installed on a locomotive; it being assumed that any consist remains attached to and in known arrangement relative to the locomotive to form a train, e.g. a single locomotive pulling a long consist may comprise a train, and knowing the position of the locomotive subsequently determines position of any attached consist which thereby establishes the position of the train as a distributed entity, etc.

The full scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
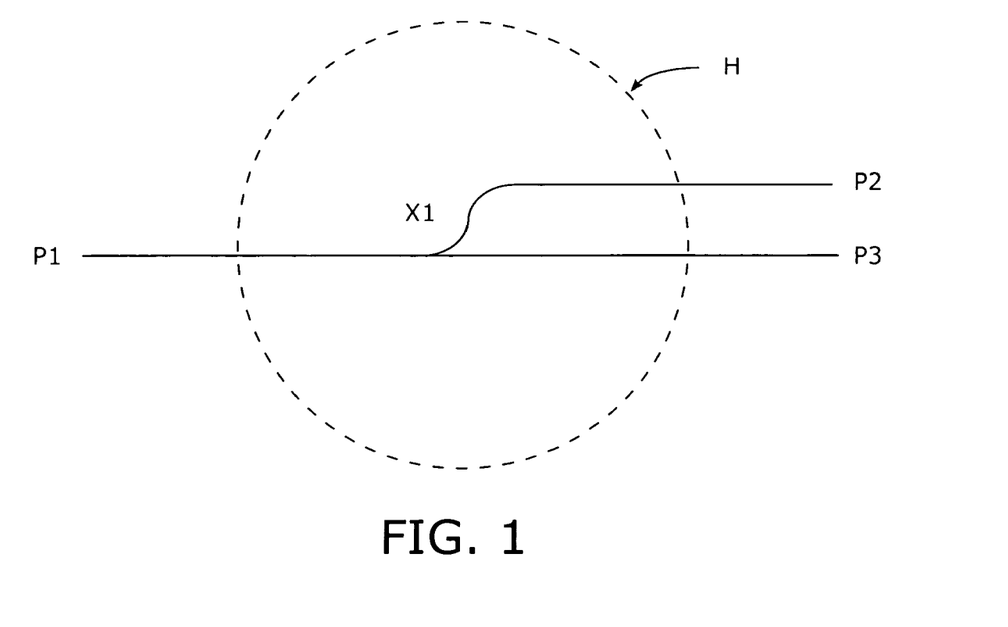
FIG. 1 is a schematic representation of a track transition including a track between points P1 and P3 and another track between points P1 and P2 with an imaginary "halo" surrounding the "S" shaped transition.

A representative track transition is shown in schematic form in FIG. 1 and includes a track segment extending between a point P1 on the left and a point P3 on the right; additionally, a cross-over section X1 interconnects the track between points P1 and P2 with a track that extends to point P3. The transition X1 can be a controllable switch, for example. Thus, in FIG. 1 a locomotive or train can proceed from point P1 on the left directly through to point P3 on the right or, alternatively, pass through transition X1 to the point P2 on the right. As is known in the art, track databases are maintained that include selected position information for sections of track and transition, features, or points of interest within the track system including latitude, longitude, azimuth (heading), and other information including elevation, inclination, and side-to-side tilt (i.e., roll). In general, these databases possess a coarse accuracy in terms of absolute latitude and longitude. As shown in FIG. 1, an imaginary "halo" H figuratively surrounds the track transition and, for the purposes of illustration, is shown as a circle. As will be evident below, the size of the "halo" H is sufficiently large so that enough data can be taken as the locomotive transits the "halo" H to determine upon which track the locomotive is on upon leaving or exiting the "halo" H or shortly thereafter.

Figure 2:
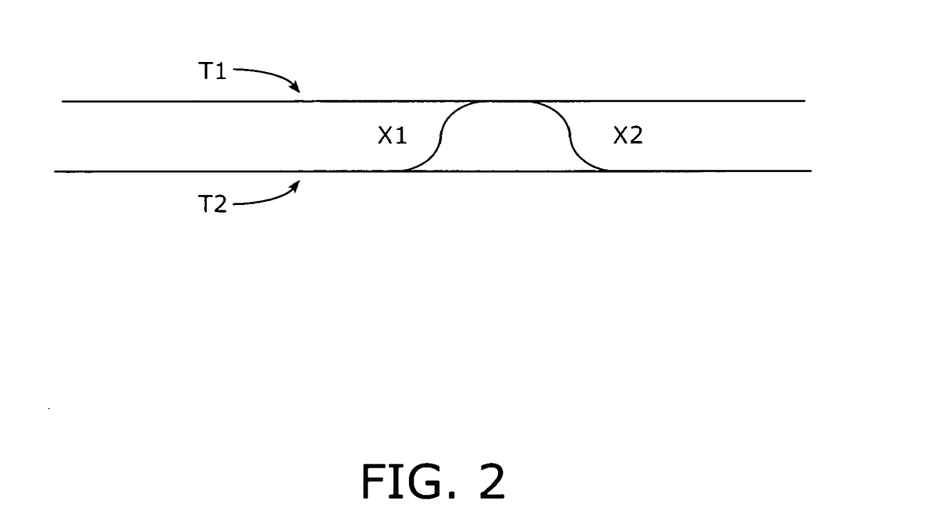
FIG. 2 is a schematic representation of two substantially parallel tracks with first and second transitions therebetween.

FIG. 2 shows another possible track transition including two spaced-parallel tracks with separate transitions X1 and X2 therebetween. As can be appreciated, a locomotive travelling from the right on the lower track can remain on that lower track or transition via X1 to the upper track and, conversely, a locomotive travelling from the left on the upper track can remain on the upper track or transition via X2 to the lower track; each type of transition will positively determine which track the locomotive is on.

Figure 3:
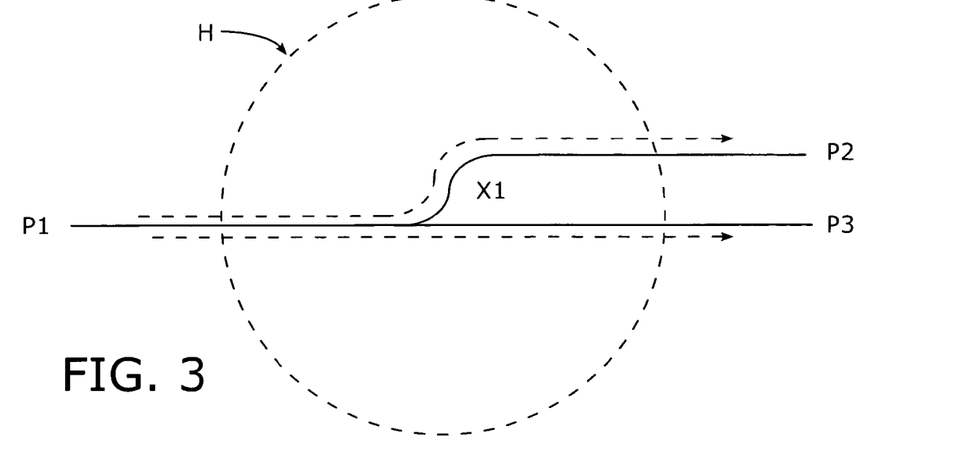
FIG. 3 is a schematic representation, similar to FIG. 1, showing in dotted-line illustration, two possible pathways through the transition.

FIG. 3 shows a track transition similar to FIG. 1 with two alternate dotted-line paths; a locomotive travelling from the right in FIG. 3 from point P1 can remain of the track to follow the first path to point P3. Additionally the locomotive can transition via the crossover X1 to follow a path to point P3. The "halo" H is a mathematical construct which is shown as a circle having in its center "reference" point at the crossover X1. As can be appreciated and depending upon the complexity of the transition(s), the "halo" H can be larger or smaller and can assume shapes/configuration other than that shown. In practice, a locomotive/train is equipped with a location determining system, such as that disclosed in U.S. Pat. No. 6,641,090 to Thomas J. Meyer and entitled "Train Location System and Method" (the disclosure of which is incorporated herein by reference). That system includes accelerometers, gyroscope(s), a satellite-based GPS, and other inputs (including a wheel tachometer) to estimate train position. The satellite-based GPS can include anyone of the current or proposed GPS variants including GPS Carrier Phase techniques, and, additionally, the location determining system can include, for example, accelerometers aligned along the x, y, z axes to provide acceleration information that can integrated over time to determine velocity and distance information and rate-of-turn gyros in the form of groups of appropriately aligned MEMS (micro-electromechanical machines) integrated silicon accelerometer structures as disclosed in commonly assigned U.S. patent application Ser. No. 10/980,191 filed Nov. 4, 2004 by Thomas J. Meyer and entitled "Locomotive Location System And Method," the disclosure of which is incorporated herein by reference. Other types of gyros are suitable, including fiber optic gyros.

Figure 5:
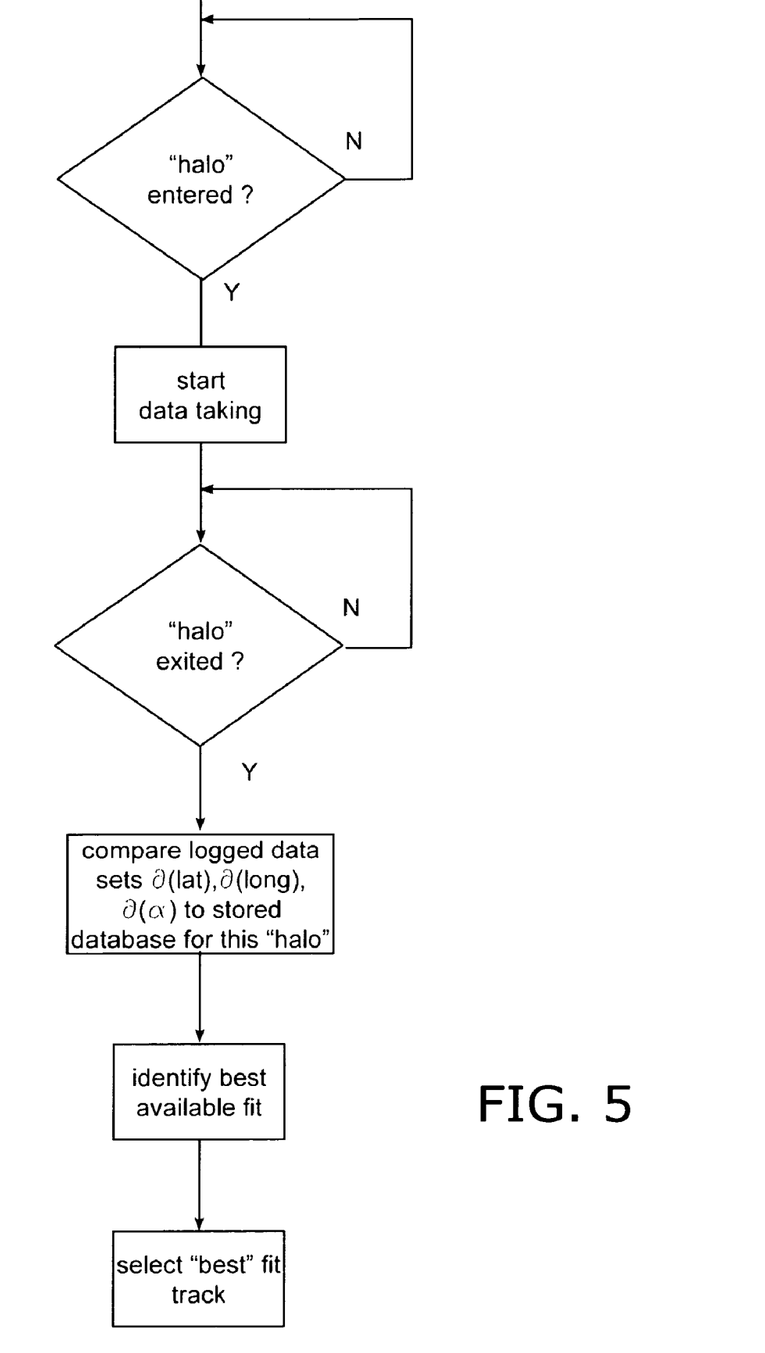
FIG. 5 is a representative process diagram by which a track identification can be made.

As shown in FIG. 3, a suitably equipped locomotive proceeding to the right from point P1 and monitoring its position will, at some point, cross the left side boundary of the "halo" H. At this point or shortly thereafter and as shown in the process chart of FIG. 5, the location determining system aboard the train begins logging/storing position data points until such time that the locomotive exits the "halo" H and halts data logging storing. The size/shape of the "halo" is selected so that a sufficiently large set of data points are collected to insure or at least maximize the probability of a valid outcome.

The data logged through the "halo" H includes plural data points for at least the latitude, longitude, and azimuth information of the locomotive for the data taking period and can also include x, y, z acceleration(s), rate-of-turn acceleration(s), inclination, tilt, and axle or wheel tachometer information as well as values integrated therefrom with time. In general, a typical track database will contain varying degrees of accuracy although most data can be viewed as coarse rather than precise; however, relative data, i.e., the difference between successive points can be viewed as 'finer' data and somewhat more accurate that the coarse data. In accordance with the preferred embodiment, a "best fit" determination is made between the logged data taken during transit through the "halo" and the pre-stored data from the track data-base including a "best fit" between latitude, longitude, and azimuth, i.e., $\delta(lat)$, $\delta(long)$, and $\delta(\alpha)$. Once the best fit has been determined, that track ID is reported as the correct track to the train operator or to the central controller.

Figure 4:
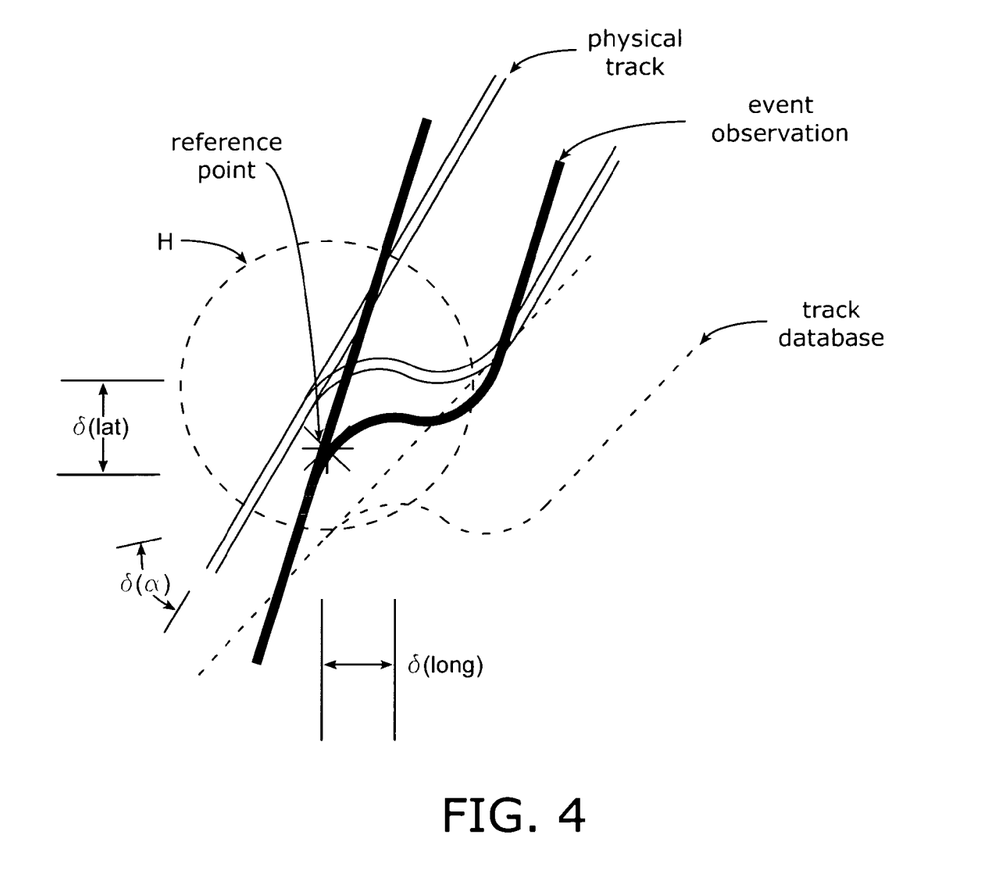
FIG. 4 is a schematic representation showing a physical track, a representation of a track abstracted from and via data taking, and a track representation from a pre-stored database.

A representative example of the present invention is shown in FIG. 4 in which the physical track is shown as two parallel spaced lines, the pre-stored database track is shown as a dotted-line and the track determined consequent to data-taking within the "halo" H is shown as a solid black line. As shown in the process chart of FIG. 5, when the locomotive enters the "halo" H data taking commences and continues until the locomotive exits the "halo" H. Immediately thereafter, a "best fit" is conducted between the data as taken and the pre-stored data in the data base (as represented in dotted-line in FIG. 4). As can be appreciated by a visual inspection of FIG. 4, the measured data and the pre-stored data are both "off" from the physical track in an absolute location sense but the relative data conforms approximately to that of the physical track and the pre-stored data representation of the physical track. The "best fit" analysis addresses a relative fit by looking to successive $\delta(lat)$, $\delta(long)$, and $\delta(\alpha)$ values between the taken and the pre-stored database data points to find a "best match" track solution to identify the track taken by the locomotive upon exiting the "halo" H.

It is well known that the cost to create and maintain a geographically accurate track database is very high. As one aspect of the present invention, a reasonably accurate track database that is continuously updated can be created by using plural locomotives/trains equipped with a train location system of the type described in above-incorporated U.S. Pat. No. 6,641,090 and the above incorporated U.S. patent application Ser. No. 10/980,191 to Thomas J. Meyer to create data. As each appropriately equipped locomotive/train approaches a point of interest (i.e., a cross-over, switch, track transition, etc.) and data collection is started and then completed with the "data fitting" thereafter accomplished, the "fitted" parameters of that point-of-interest is then thereafter transmitted over a wireless communication pathway to a central facility to be logged or otherwise accumulated. The communication pathway can take the form of a direct point-to-point radio-frequency link and/or wireless WANs consistent with the IEEE 802.1x standards; other communications pathways including those based upon communications along the trackway and by satellites are not excluded.

In time and as other locomotives/train traverse and/or re-traverse that point of interest, the cumulative set of "fitted data" is then subject to a statistical assessment (i.e., averaging, distributions, etc.) to determine if the received "fitted data" possesses sufficient veracity for database updating. This aspect of the invention is useful, for example, when a point of interest is subject to a position change consequent to a repair, positional adjustment, or reconfiguration. Where the "fitted data" is shown to have a high degree of veracity, the "fitted data" value(s) can then be entered into the track database without the need (and cost) for a new survey of the point of interest.

Figure 6:
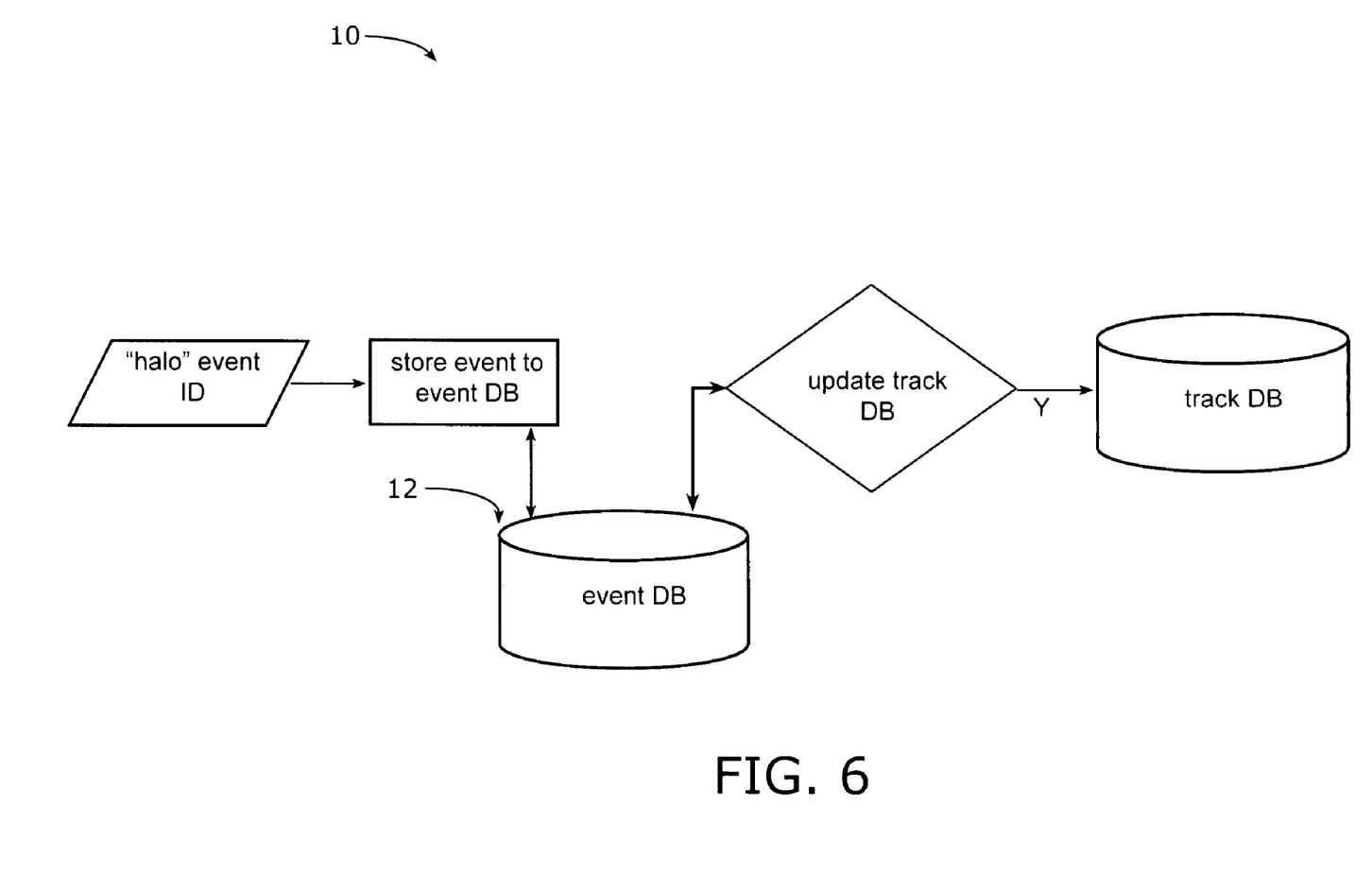
FIG. 6 is a simplified graphical representation of event and track databases.
Figure 7:
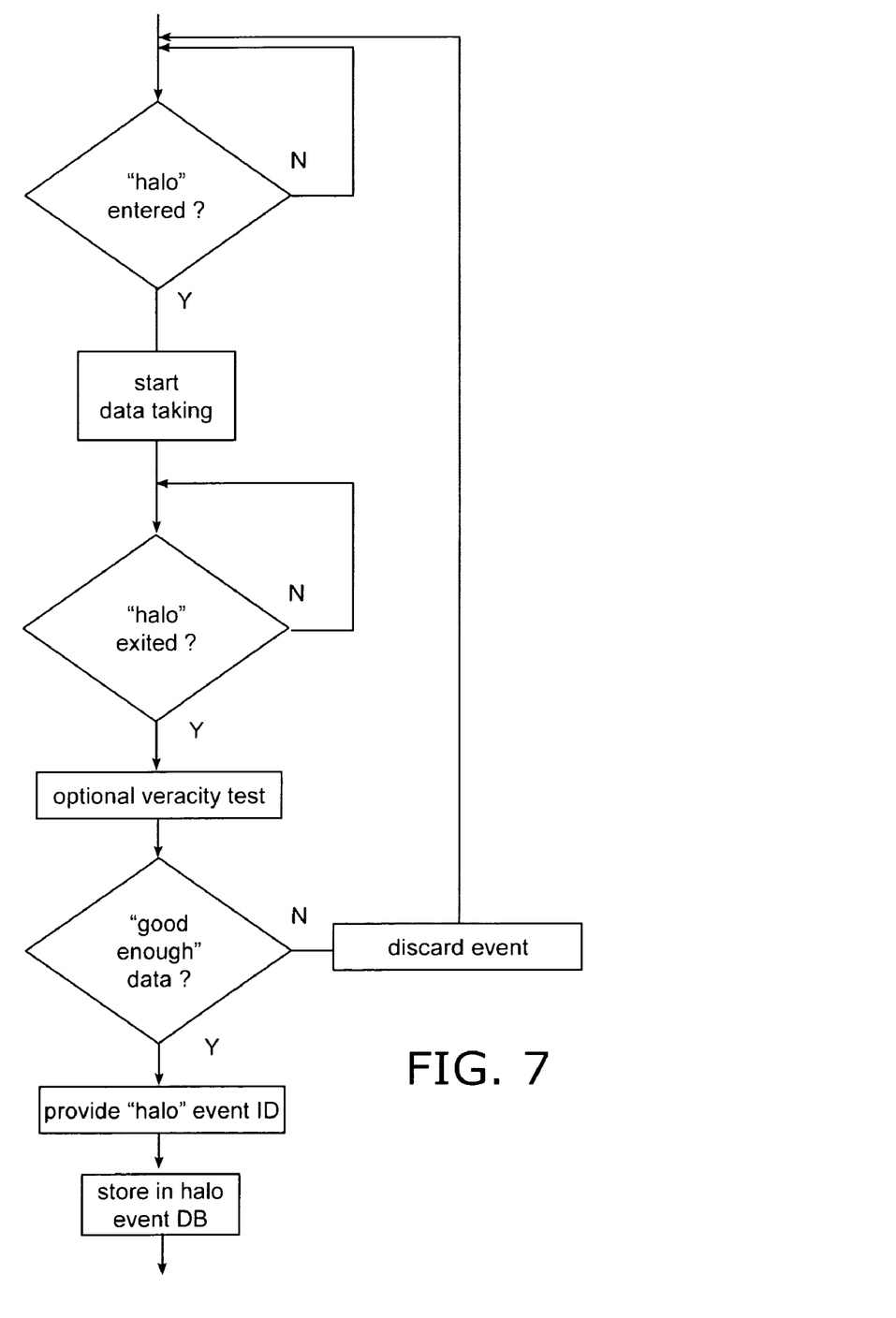
FIG. 7 is a representative flow diagram of a procedure for obtaining and logging observed events.
Figure 8:
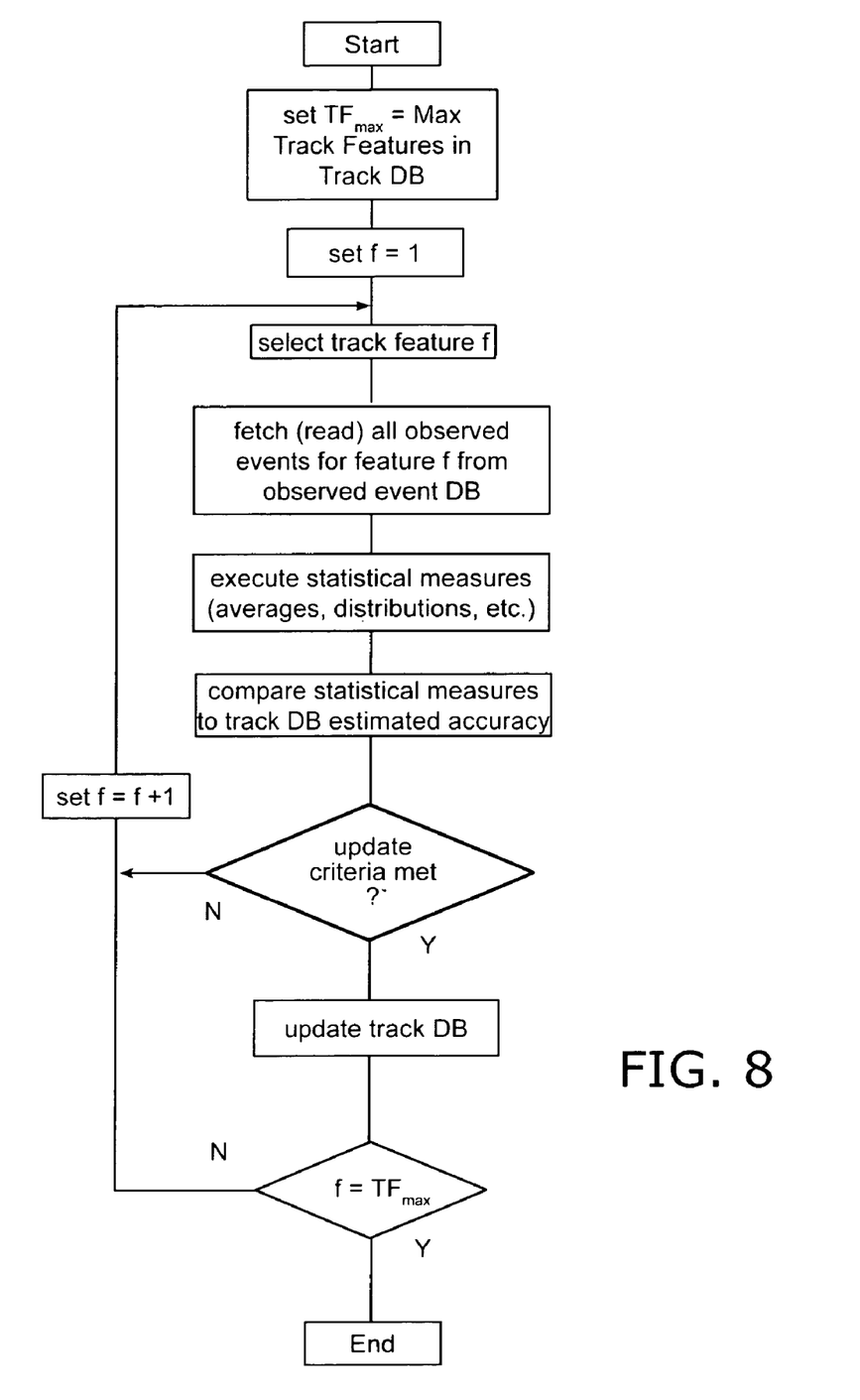
FIG. 8 is in a representative flow diagram of a procedure for updating a track database with information derived from observed events.

FIG. 6 represents a simplified organization 10 for a track database containing historical or legacy track information and a observed events data base 12 that cooperates with the flow diagrams of FIGS. 7 and 8. More specifically, halo observation "events" can be accumulated in the system 10 which includes an observation event database 12 that typically includes at least one data table; the information stored can include the event ID, δ(lat), δ(long), and δ(α) as well as other information including the aforementioned GPS and linear and rate-of-turn information as well as inclination and/or tilt data.

Halo event information can be taken a processed, for example, in accordance with FIG. 7; as shown, once a determination is made that a halo has been entered, data taking is commenced until the halo is exited. Thereafter, the data accumulated within the halo can be subject to a veracity or validity test (e.g., one or more standard deviations or other limit-bounding) to determine if the data is "good enough" for further use. Data that does not pass the veracity or validity test (e.g., as a consequence of incomplete data taking or in interruption in the data flow) can be discarded. If the data passes the optional veracity test, it is provided with a unique identifier and stored in the event DB 12 (FIG. 6). Preferably, the data associated with each halo event includes an associated "estimate accuracy" and/or other estimated parameter attribute that is stored with the observed data; these attributes can assist in refining the track database as explained below.

Once a sufficient number of unique halo observed event are accumulated in the event database 12, a decision can be made to evaluate those observed events and, depending upon the outcome, update the track database. For example and as shown in FIG. 8, a variable $TF_{max}$ is set to a maximum value equal to the number of track features to be evaluated and a recurring loop established. For each successive feature, the observed events are obtained from the event database 12 (FIG. 6) and subject to statistical measures (averages, distributions, etc.) with those measures compared to the track DB estimated accuracy; where the comparison is valid, the track database can be updated by, for example, merging the data associated with the observed events with the historical track data or by merely replacing the historical data with the observed events.

As will be apparent to those skilled in the art, various changes and modifications may be made to the illustrated embodiment of the present invention without departing from the spirit and scope of the invention as determined in the appended claims and their legal equivalent.

The invention claimed is:

1. A method of determining track identification for a locomotive passing through a transition in a trackway system, the transition having at least two possible exit tracks, comprising the steps:
   defining an area about at least one transition in the trackway system for which track identification is desired;
   logging position information upon entry by the locomotive in the defined area about the at least one transition until the locomotive exits the defined area, the position information including satellite-based GPS information, wheel tachometer information, and inertial information derived from integrated acceleration values; and
   conducting a best fit analysis as a function of at least one of the latitude, longitude, and azimuth between the logged data and a pre-stored database to determine which of the exit tracks is occupied by the locomotive.

2. The method of claim 1, wherein said last-mentioned step includes:
   conducting a best fit analysis as a function of at least two of the latitude, longitude, and azimuth between the logged data and a pre-stored database to determine which of the exit tracks is occupied by the locomotive.

3. The method of claim 1, wherein said last-mentioned step includes:
   conducting a best fit analysis as a function of the latitude, longitude, and azimuth between the logged data and a pre-stored database to determine which of the exit tracks is occupied by the locomotive.

4. The method of claim 1, wherein said last-mentioned step includes:
   conducting a best fit analysis as a function of the difference between the logged at least one of the latitude, longitude, and azimuth and the corresponding value in the pre-stored database.

5. A method of determining track identification for a locomotive passing through a transition in a trackway system, the transition having at least two possible exit tracks, comprising the steps:
   defining a perimeter about at least one transition in the trackway system for which track identification is desired;
   logging position information upon passage by the locomotive over the defined perimeter about the at least one transition until the locomotive exits the defined perimeter, the position information including satellite-based GPS information, wheel tachometer information, and inertial information derived from integrated acceleration values; and
   conducting a best fit analysis as a function of at least one of the latitude, longitude, and azimuth between the logged data and a pre-stored database to determine which of the exit tracks is occupied by the locomotive.

6. The method of claim 5, wherein said last-mentioned step includes:
   conducting a best fit analysis as a function of at least two of the latitude, longitude, and azimuth between the logged data and a pre-stored database to determine which of the exit tracks is occupied by the locomotive.

7. The method of claim 5, wherein said last-mentioned step includes:
   conducting a best fit analysis as a function of the latitude, longitude, and azimuth between the logged data and a pre-stored database to determine which of the exit tracks is occupied by the locomotive.

8. The method of claim 5, wherein said last-mentioned step includes:
   conducting a best fit analysis as a function of the difference between the logged at least one of the latitude, longitude, and azimuth and the corresponding value in the pre-stored database.

9. A method of updating a trackway database having position information therein regarding at least one transition in a trackway system, the at least one transition having a predefined perimeter, an entry track, and at least two exit tracks, said method comprising:
   logging the position of a locomotive moving through the transition during the time period between the locomotive passing through the perimeter on the entry track and passing through the perimeter on an exit track, the position information including satellite-based GPS information, wheel tachometer information, and inertial information derived from integrated acceleration values;
   repeating said first-mentioned step to log a plurality such moving-through-the-transition events;
   updating the values stored in the trackway database for that transition as a function of the plurality of logged transition events.

10. The method of claim 9, further comprising, prior to said updating step, the step of subjecting the logged data to a validity test and discarding any data that does not pass the validity test.

11. The method of claim 9, wherein the updating step comprises merging the stored and logged data values.

12. The method of claim 9, wherein the updating step comprises replacing the stored values with the logged data values.

* * * * *